United States Patent Office 3,526,960
Patented Sept. 8, 1970

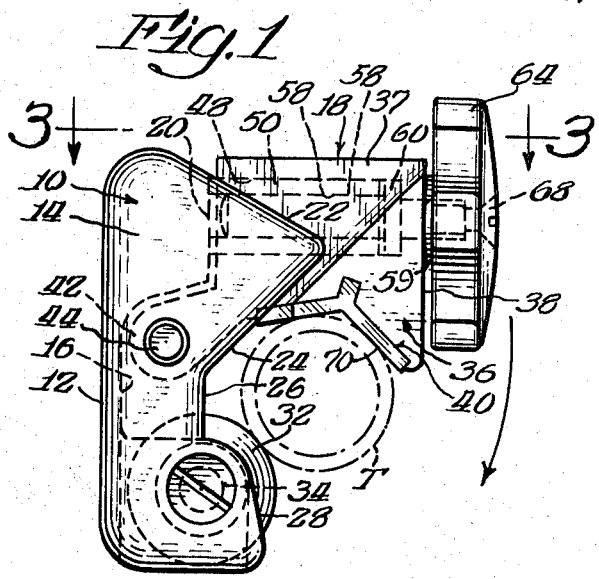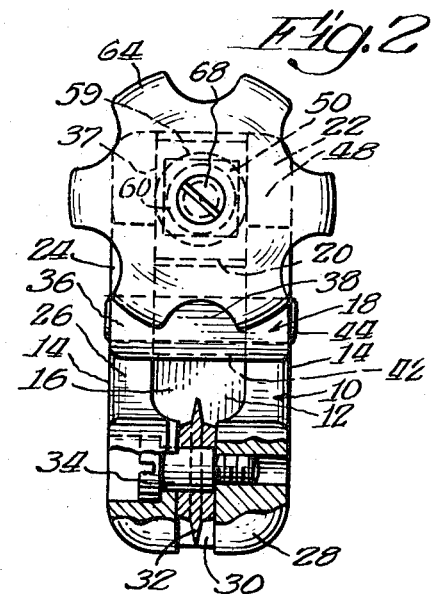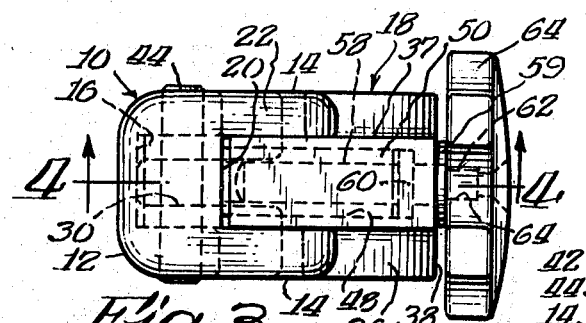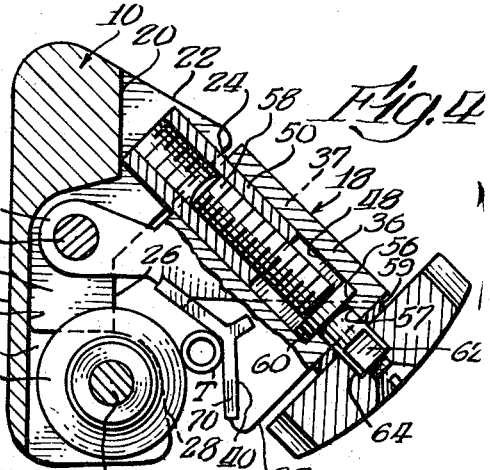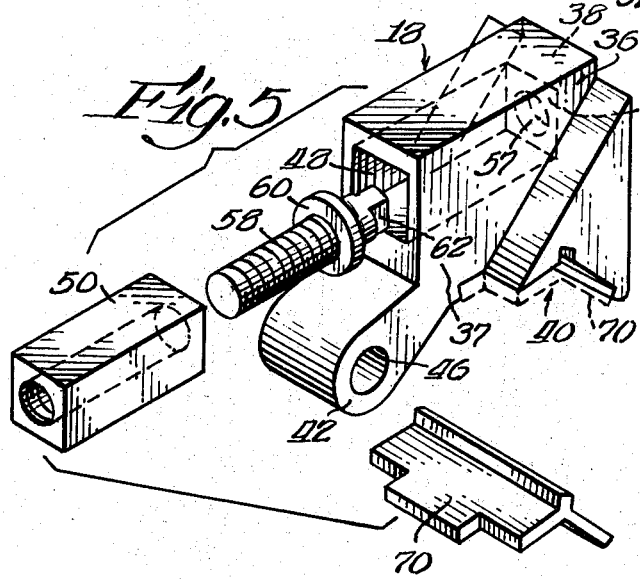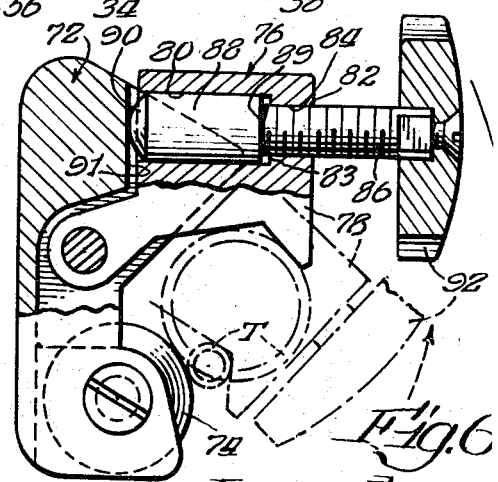

3,526,960
MANUALLY OPERABLE TUBE CUTTER
William C. Gore, Streamwood, and Eugene B. Shapiro, Highland Park, Ill., assignors to Chicago Specialty Manufacturing Co., Skokie, Ill., a corporation of Illinois
Filed Feb. 21, 1968, Ser. No. 707,049
Int. Cl. B23d 21/08; B26d 3/16
U.S. Cl. 30—102
6 Claims

ABSTRACT OF THE DISCLOSURE

A cutting tool having a body member which supports a rotatably mounted cutting wheel. A pivotal member is pivotally secured to the body member and said pivotal member has a jaw surface adapted to engage a tube to be cut. Said pivotal member has means for positioning the pivotal member in relation to the cutting wheel.

---

This invention relates to a manually operable tube cutter. The invention has particular applicability to a small cutting tool which is capable of cutting the smallest tubes and which will operate in a minimum of space. However, it is not limited to small compact cutting tools as cutting tools of larger sizes may be used within the purview of this invention.

SUMMARY OF THE INVENTION

One of the objects of this invention is to provide a tube cutter in which the body portion supports a rotatable cutting wheel and in which the jaw member is pivotally mounted and movable with respect to the cutting wheel. Means are provided for maintaining the adjusted position of the pivotal member so that the jaw clamps the tube between the jaw and the cutting wheel.

Another object of this invention is to provide a tube cutter which may be made in a miniature size, which is compact and very simple in construction, which can cut tubes having the smallest diameter, and which will operate in a very limited space.

Other objects will become apparent as this description progresses.

In the drawings:

FIG. 1 is a side elevational view of the preferred embodiment of this invention.

FIG. 2 is a front view thereof.

FIG. 3 is a top view taken on line 3—3 of FIG. 1.

FIG. 4 is a central sectional view taken on line 4—4 of FIG. 3 and showing the pivotal member pivoted forwardly from that shown in FIG. 1 to engage a tube of a smaller diameter than that shown in FIG. 1.

FIG. 5 is an exploded perspective view of certain of the parts.

FIG. 6 is a central sectional view of a modification.

Generally described, the tube cutter comprises a body member which supports a cutter wheel adjacent one end thereof. A pivotal member which carries a jaw to engage the tube to be cut is pivotally connected to the body member and is pivoted in adjusted relation to the cutter wheel by a rotatable knob.

Reference will be made first to the tube cutter shown in FIGS. 1 to 5 inclusive.

More specifically, the tube cutter has a body member generally indicated at 10, which has a base or bottom 12 with upwardly extending spaced side walls 14 of the configuration best shown in elevation in FIG. 1. The spaced side walls 14 form a recess 16 in the body member to receive a pivotal member generally indicated at 18. The bottom 12 of the body member 10 extends upwardly at the rear end to provide a raised surface 20 which is engaged by the sleeve of the pivotal member 18. The side walls 14 of the body member adjacent the rear end thereof have upwardly and inwardly inclined edge surfaces 22 and 24 to form a generally triangular shape. The side walls 14 continue forwardly as at 26 from the bottom of the inclined edge 24 and then continue upwardly at an inclined angle as at 28 to form the front upper ends of the body member 10. The side walls 14 adjacent the front ends have thickened wall surfaces to provide a reduced recess 30 between the side walls. Rotatably supported between the side walls 14 at the front end is a cutter wheel or cutter disk 32 which is rotatably supported on a shaft 34 extending between the side walls 14 and secured to the side walls.

The pivotal member 18 has a body section 36 with sides 37 and a planar top surface 38 and a forwardly extending jaw member generally indicated at 40 which has a generally V-shaped configuration to engage the tube member T to be cut. An extension 42 of the width of the body section 36 extends downwardly of the body section. The extension is positioned between the side walls 14 of the body member 10.

The pivotal member 18 is pivotally secured to the body member 10 by a shaft or pin 44 anchored to the side walls 14 and passing through a transverse opening 46 in the extension 42 of the pivotal member. The jaw member 40 of the pivotal member 18 is wider than the body section 36. The width of the jaw member 40 is substantially that of the width of the body member 10.

The body section 36 of the pivotal member 18 has a bore 48 which is either square-shaped or rectangular-shaped to slidably receive an internally threaded sleeve or nut 50 having a cross-sectional shape complementary to that of the bore 48 so that it can be advanced or retracted axially within the bore 48 without rotation of said sleeve or nut 50. The upper end of the bore 48 has a reduced diameter to provide a shoulder 56 and a reduced annular opening 57 at the upper end.

An externally threaded shaft 58 is received in the internally threaded sleeve or nut 50. The shaft 58 has an integral annular-shaped shoulder 60 which engages the shoulder 56 of the body section 36 of the pivotal member 18. The screw shaft 58 has a head 62 with flat sides which is secured in a complementary shaped recess 64' in a knob 64, which knob is suitably secured to the screw shaft by a small screw or other fastening element 68. A thrust washer 59 of Teflon or the like is positioned on the upper end of the screw shaft 58 just below the head 62. The washer rests between the knob 64 and the top planar surface 38 of the pivotal member 18. The washer serves as a spacer between the top of the pivotal member and the knob; it raises the knob to provide a better feel and reduces the friction between the knob and the pivotal member. Manual rotation of the knob 64 will rotate the screw shaft 58 to advance or retract the threaded sleeve 50, however, there will be no axial movement of the screw shaft 58 when it is rotated.

The jaw member 40 may have its surfaces protected by a protective insert, generally indicated at 70, which is generally Y-shaped and formed of Teflon or nylon or the like. It is suitably secured or anchored in the jaw member 40, as best shown in FIG. 4. Its primary function is to reduce the turning friction when the jaw is in engagement with the tube T. It will also reduce the likelihood of the jaw making markings on the tube.

The operation of the device shown in FIGS. 1 to 5, briefly described, is as follows. The pivotal member 18 is pivoted to the position shown in FIG. 1 wherein the body section 36 of the pivotal member 18 is substantially at right angles to the base 12 of the body member 10. In this position the maximum opening is provided for the insertion of the tube T. This position of the pivotal member is obtained by rotating the knob 64 which rotates the screw shaft 58 to move the threaded sleeve or nut 50 inwardly into the bore 48 of the pivotal member until the end of the sleeve or nut 50 engages the shoulder 60 on shaft 58. The bottom end of the sleeve or nut 50 can then be positioned so that it engages the raised surface 20 of the body supporting member 10 and permits the pivotal member 18 to be positioned at right angles to the base 12.

A tube T can then be inserted into the space between the jaw 40 and cutter wheel 32 and by rotating the knob 64 clockwise the screw shaft 58 is correspondingly rotated to advance the screw sleeve 50 by virtue of the left hand thread in sleeve 50 and shaft 58 so that the lower end of sleeve 50 engages the raised surface 20 of the body member 10 which causes the pivotal member 18 to pivot forwardly and moves the jaw 40 against the tube T and toward the cutting wheel. When the tube T is pressing against the cutting wheel 32 the tube T will be clamped in position between the jaw and the cutting wheel. The tube cutter is then rotated around the tube T which will cause the cutter to cut into the tube. The pivotal member 18 is pivoted forwardly to increase the cutting by manually rotating the knob 64 clockwise which continues moving the threaded sleeve 50 outwardly of the bore. Rotating the knob in the opposite direction, i.e., counterclockwise, will permit the pivotal member 18 and the jaw 40 to move away from the cutting wheel and release the tube.

The modification shown in FIG. 6 will now be described. It embodies a body supporting member 72 identical to the body supporting member 10 previously described, as well as a cutter wheel 74 identical to that previously described. It includes a pivotal member designated by the numeral 76 which is pivotally secured to the body supporting member 72 in the manner previously described. The pivotal member 76 has a body section 78, however, the body section is provided with a bore 80 which is circular in cross-section in contrast to the square or rectangular-shaped bore 48 previously described. The bore has a reduced upper end 82 which provides a shoulder 83. The upper end is internally threaded as at 84. A screw shaft 86 is in threaded engagement with the internally threaded upper end 83. The lower end of the screw shaft has an enlarged annular plug 88 which provides a shoulder 89 between the screw shaft and plug. The plug 88 rotates within the bore 80 when the screw shaft 86 is rotated. The lower end of the plug is rounded as at 90 to seat on the raised surface 91 of the body supporting member 72. Suitably affixed to the upper end of the screw shaft 86 is a knob 92.

The operation of the device briefly described is as follows. Rotating the knob 92 clockwise will rotate the screw shaft 86 downwardly in the pivotal member 76 so that the lower end of the screw shaft will extend outwardly beyond the bottom of the bore 80 of the pivotal member as it engages the raised surface 91 on the supporting member 72, thus, causing the pivotal member to pivot forwardly, as shown in dotted lines in FIG. 6, similarly to that previously described, and thereby move the jaw member on the pivotal member in the direction of the cutting wheel. Rotating the knob 92 in the opposite direction, i.e., counterclockwise will move the screw shaft 86 so that the plug 88 of the screw shaft is moved inwardly into the bore 80 of the pivotal member, thus permitting the pivotal member to be positioned at right angles to the base of the body supporting member, as shown in full lines in FIG. 6, to provide the maximum spacing between the jaw and the cutting wheel, similar to that previously described.

It will be understood that various changes and modifications may be made from the foregoing without departing from the spirit and scope of the appended claims.

What is claimed is:

1. A tube cutter comprising a body member, a cutting member adjacent one end thereof, a pivotal member pivotally mounted on said body member and pivotally movable toward or away from said cutting member, said pivotal member having a jaw adapted to engage a tube and hold said tube between said jaw and cutting member, rotatable means comprising a threaded shaft carried by said pivotal member and in engagement with an internally threaded sleeve, which sleeve is axially movable in said pivotal member and is adapted to engage the body member to permit said pivotal member to move toward or away from said cutting member, said shaft and sleeve comprise a completely enclosed and captive mechanism.

2. A tube cutter as defined in claim 1 in which the pivotal member has a bore to receive an axially slidable internally threaded nut or sleeve which is axially movable by the rotation of the rotatable means which comprises a threaded member manually rotatable by means of a knob.

3. A tube cutter as defined in claim 2 in which the body member has a recessed portion and in which the pivotal member has an extension supported within said recessed portion and pivotally connected to the body member.

4. A tube cutter comprising a body member, a cutting member adjacent one end thereof, a pivotal member pivotally mounted on said body member and pivotally movable toward or away from said cutting member, said pivotal member having a jaw adapted to engage a tube and hold said tube between said jaw and said cutting member, said pivotal member having a square or rectangular-shaped bore, an internally threaded sleeve having a shape complementary to the shape of the bore and received in said bore, a rotatable threaded shaft in said internally threaded sleeve whereby rotation of said shaft will cause said threaded sleeve to move outwardly of said pivotal member or to be retracted within said pivotal member, the position of said threaded sleeve with respect to the body member permitting the adjustable pivoting of said pivotal member toward or away from said cutting member.

5. A tube cutter defined in claim 4 in which the threaded shaft has a shoulder in engagement with the upper end of the pivotal member and wherein the threaded shaft is secured to a knob so that while the threaded shaft is rotatable by said knob it is confined within the pivotal member, and wherein the threaded sleeve while capable of axial movement with respect to the pivotal member is held captive.

6. A tube cutter comprising a rectilinear body member, a cutting wheel rotatably supported on said body member adjacent one end thereof, said body member having spaced side walls defining a recess therebetween, a pivotal member pivotally mounted inside said recess between said side walls of said body member substantially midway of the opposite ends of the rectilinear body member, said pivotal member extending outwardly of said recess and having a jaw on said pivotal member adapted to engage a tube and hold said tube between said jaw and cutting member, said rectilinear body member having a raised surface adjacent one end of said body member and extending into said recess between said side walls, a rotatable threaded shaft carried by said pivotal member, said threaded shaft connected to means which extend into said recess and engage the raised surface on said body member to permit said pivotal member to move toward or away from said cutting member.

References Cited

UNITED STATES PATENTS 2,988,814  6/1961  Carpenter _____ 30—102

OTHELL M. SIMPSON, Primary Examiner